United States Patent [19]
Bergerson et al.

[11] Patent Number: 5,662,353
[45] Date of Patent: Sep. 2, 1997

[54] ELECTRICAL CONDUCTOR FOR AIR BAG INFLATOR

[75] Inventors: Lee D. Bergerson, Fountain Valley; Ivan L. Stonich, Hermosa Beach; Terrence J. Coultas, Canyon Country, all of Calif.

[73] Assignee: TRW Vehicle Safety Systems Inc., Lyndhurst, Ohio

[21] Appl. No.: 568,351

[22] Filed: Dec. 6, 1995

[51] Int. Cl.$^6$ ........................................ B60R 21/26
[52] U.S. Cl. .................. 280/737; 280/741; 137/68.13; 222/3
[58] Field of Search ........................... 280/737, 736, 280/741, 740, 742; 137/68.13, 68.19, 68.23, 68.28; 222/3, 5

[56] References Cited

U.S. PATENT DOCUMENTS

| | | | |
|---|---|---|---|
| 3,191,533 | 6/1965 | Hopson, III | 137/68.13 |
| 3,686,428 | 8/1972 | Lombardi et al. | 174/128.1 |
| 3,777,772 | 12/1973 | Arnold et al. | 280/737 |
| 3,829,124 | 8/1974 | Charns et al. | 280/737 |
| 3,905,515 | 9/1975 | Allemann | 280/737 |
| 5,033,772 | 7/1991 | Frantom et al. | 280/737 |
| 5,136,952 | 8/1992 | Bennett, Jr. | 280/741 |
| 5,273,312 | 12/1993 | Coultas et al. | 280/737 |
| 5,280,951 | 1/1994 | Rizzi et al. | 280/736 |
| 5,348,344 | 9/1994 | Blumenthal et al. | 280/737 |
| 5,372,886 | 12/1994 | Inazawa et al. | 174/110 A |

*Primary Examiner*—Brian L. Johnson
*Assistant Examiner*—Peter C. English
*Attorney, Agent, or Firm*—Tarolli, Sundheim, Covell, Tummino & Szabo

[57] ABSTRACT

An inflator (26) provides inflation fluid for inflating an inflatable vehicle occupant protection device (24). The inflator (26) comprises an electrically conductive container (64) defining a chamber (66) for holding fluid at a first pressure. An electrically actuatable device (48) is located in the chamber (66) for effecting a change in the pressure of the fluid in the chamber to a second pressure greater than the first pressure. A first surface (206) defines a tapered portion (202) of a passage (200) extending through the container (64). An electrical conduit (220) extends through the tapered portion (202) to deliver electrical energy to the electrically actuatable device (48). The electrical conduit (220) has opposite connector ends (224, 226) and a tapered body (222) contacting the first surface (206) to provide a fluid seal. One connector end is located in the chamber (66) and is electrically connectable with the electrically actuatable device (48). The other connector end (226) is located outside of the chamber (66) and is electrically connectable with a source of electrical power (42). Anodic coating (240) is located on at least one of the first surface (206) and the tapered body (222) to provide electrical insulation between the container (64) and the electrical conduit (220).

15 Claims, 3 Drawing Sheets

ELECTRICAL CONDUCTOR FOR AIR BAG INFLATOR

The present invention relates to a vehicle occupant protection system, and particularly to an inflator which provides inflation fluid for inflating an inflatable protection device, such as an air bag.

BACKGROUND OF THE INVENTION

Inflators which provide inflation fluid for inflating air bags are known. The inflators typically include a container which is made from metal and/or other electrically conductive materials. One type of inflator stores an inflation fluid under pressure in a chamber inside the container and has an initiator, a squib or an igniter located in the chamber. The initiator, squib or igniter is electrically energized to effect inflation of the air bag upon the occurrence of a vehicle situation, such as a collision, for which inflation of the air bag is desired. In this type of inflator, inflation is typically effected by igniting ignitable material in the container to heat the inflation fluid.

In another type of inflator, a mixture of gases is stored in the chamber in the container under pressure. A combustible portion of the mixture of gases is ignited by electrical energization of the initiator, squib or igniter located in the chamber. Combustion of the combustible portion of the mixture of gases heats and pressurizes the remaining portion of the mixture of gases which includes inflation fluid.

In either type of inflator, electrical energy must be communicated through an electrically conductive wall of the container and into the chamber. Communicating electrical energy through an electrically conductive wall of a container while maintaining the container in a fluid-tight condition over relatively long periods of time is difficult.

SUMMARY OF THE INVENTION

The present invention is directed to an inflator which provides inflation fluid for inflating a vehicle occupant protection device, such as an air bag. The inflator comprises an electrically conductive container having a wall which defines a chamber for holding a fluid under pressure. Electrically actuatable means for starting the flow of fluid from the container is located in the chamber. First surface means of the container defines a passage extending through the wall of the container. An electrical conduit extends through the passage to deliver electrical energy to the electrically actuatable means in the chamber. The electrical conduit includes second surface means contacting the first surface means of the container to provide a fluid seal between the first and second surface means. Anodic coating is located on at least one of the first and second surface means and provides electrical insulation between the wall of the container and the electrical conduit.

The electrical conduit is made of aluminum. The anodic coating is anodic oxidation formed over the aluminum. The second surface means of the electrical conduit defines a tapered body. The electrical conduit further includes a pair of end portions. Each end portion is located at a respective opposite end of the tapered body and is adapted to be connected to an electrical conductor.

The first surface means of the container defines a tapered passage which receives the tapered body of the electrical conduit to provide the fluid pressure sealing contact. A larger end of the tapered passage is located closer to the chamber than a smaller end of the tapered passage. A first one of the end portions of the electrical conduit is located adjacent a larger portion of the tapered body. The first end portion is adapted to be exposed to pressurized fluid within the chamber to urge the tapered body against the first surface means to inhibit fluid flow between the tapered passage and the tapered body.

The container includes third surface means defining an opening through which fluid can flow to inflate the protection device. A closure extends across the opening and has a first condition in which fluid flow through the opening is blocked. The closure has a second condition in which fluid flow through the opening to inflate the protection device is allowed. The closure comprises a weakened area which ruptures in response to fluid pressure in the chamber increasing to a predetermined pressure.

The inflator further includes a first wire which is connectable with the first end portion of the electrical conduit for conducting electrical energy to the electrically actuatable means inside the chamber. A second wire is connectable with a second end portion of the electrical conduit at a location outside of the chamber for conducting electrical energy to the electrical conduit.

BRIEF DESCRIPTION OF THE DRAWINGS

Further features of the present invention will become apparent to those skilled in the art to which the present invention relates from reading the following specification with reference to the accompanying drawings, in which.

DESCRIPTION OF A PREFERRED EMBODIMENT

Figure 1:
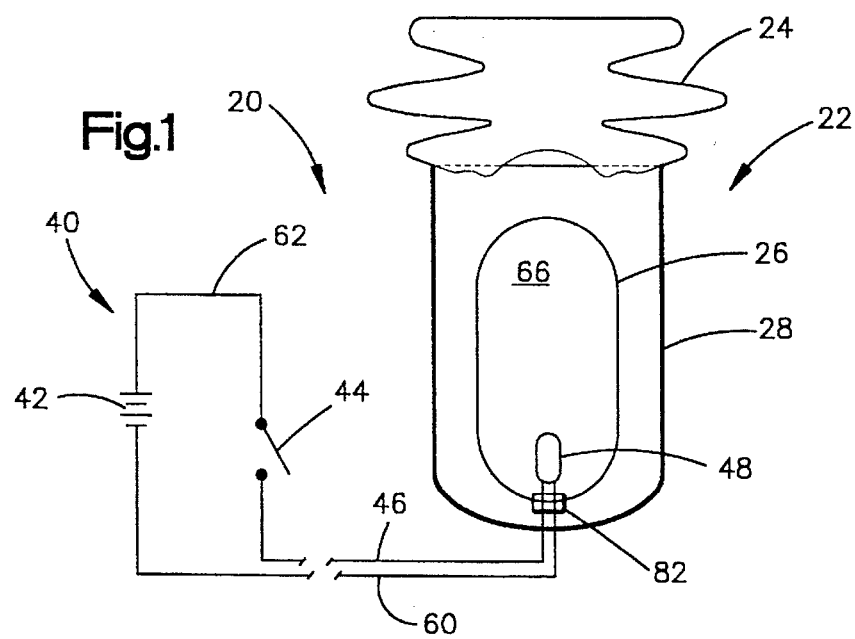
FIG. 1 is a schematic illustration of an inflatable occupant protection system which includes an inflator embodying the present invention.

The present invention is embodied in a vehicle occupant protection system 20 (FIG. 1). The protection system 20 comprises a module 22 which includes an inflatable vehicle occupant protection device, such as an air bag 24. The module 22 also includes an inflator 26 for inflating the air bag 24, and a reaction canister 28. The reaction canister 28 mounts the air bag 24 and houses the inflator 26.

The protection system 20 also includes an electrical energization circuit 40 which is operably connected to the inflator 26 when the module is installed in a vehicle. The circuit 40 delivers electrical energy to the inflator 26 to actuate the inflator. The circuit 40 includes an electrical power source 42, such as a vehicle battery or a capacitor, and a normally open switch 44.

A wire 46 electrically connects an actuating device 48, such as an igniter or a squib, which is located inside the inflator 26 to one terminal of the switch 44. A wire 60 electrically connects the actuating device 48 with one pole of the power source 42. A wire 62 connects another terminal of the switch 44 to another pole of the power source 42.

The normally open switch 44 is included in a sensor (not shown). When a vehicle situation, such as a collision, which requires inflation of the air bag 24 is detected, the switch 44 closes. The circuit 40 is complete and electrical energy is conducted to the actuating device 48. The air bag 24 is inflated by inflation fluid flowing from the inflator 26 upon electrical energization of the actuating device 48. The air bag 24 expands into a compartment of the vehicle between the occupant and parts of the vehicle, such as the steering wheel, instrument panel, door and the like. The air bag 24 absorbs kinetic energy resulting from movement of the occupant relative to the vehicle to cushion, restrain and protect the occupant from forcibly striking the parts of the vehicle.

The inflator 26 includes a container 64 (FIG. 2) which defines a chamber 66 for storing a gas or a mixture of gases under pressure. If a gas, such as nitrogen or argon, is stored in the chamber 66, the gas serves as the inflation fluid. Preferably, a mixture of gases is stored in the chamber 66 and at least one of the gases is ignitable. The mixture of gases provides heated and pressured inflation fluid in response to a chemical reaction, such as combustion of at least one gas in the mixture of gases.

The initial pressure of the mixture of gases stored in the chamber 66 depends on various factors. The various factors include the volume of the air bag 24 to be inflated, the time available for fully inflating the air bag, the pressure desired in the fully inflated air bag, the volume of the chamber 66 for storing the mixture of gases, the percentage of each of the gases in the mixture of gases, and the composition of each of the gases in the mixture of gases. The pressure of the mixture of gases in the chamber 66 is in the range of about 500 to 5,000 pounds per square inch (psi). Preferably, the pressure of the mixture of gases in the chamber 66 is in the range of about 1,000 to 3,000 psi.

The mixture of gases in the chamber 66 of the container 64 preferably includes a fuel gas, an oxidizer gas and an inert gas. The fuel gas in the chamber 66 readily combusts, when ignited, but otherwise is not explosive. The mixture of gases could have many different compositions. For example, the fuel gas may be 2–16 molar percent of the mixture of gases. The oxidizer gas may be 7–98 molar percent of the mixture of gases. The balance is inert gas which may be 10–91 molar percent of the mixture of gases.

The fuel gas is preferably hydrogen, but may be methane or a mixture of hydrogen and methane. The oxidizer gas is preferably oxygen. The inert gas is preferably nitrogen, argon or a mixture of nitrogen and argon. Preferably, the mixture of gases includes 10–14 molar percent hydrogen, 15–25 molar percent oxygen, and 61–75 molar percent inert gas. An amount of helium, typically 5 molar percent, may be included for leak detection as is known in the art.

The actuating device 48 is a known structure, such as an igniter or a squib. The actuating device 48 is electrically energized to ignite the fuel gas in the mixture of gases stored in the chamber 66. Combustion of the fuel gas in the chamber 66 is supported by the oxidizer gas to produce combustion products. The combustion products heat and pressurize the inert gas for inflating the air bag 24.

The container 64 (FIG. 2) includes an elongate cylinder 68 which is made from an electrically conductive metal, preferably aluminum or steel. An opening 80 is formed at one end of the cylinder 68 of the container 64. An electrically conductive metal retainer 82 forms part of the container 64 and is located in the opening 80. The retainer 82 is fixed to a portion of the cylinder 68.

Figure 3:
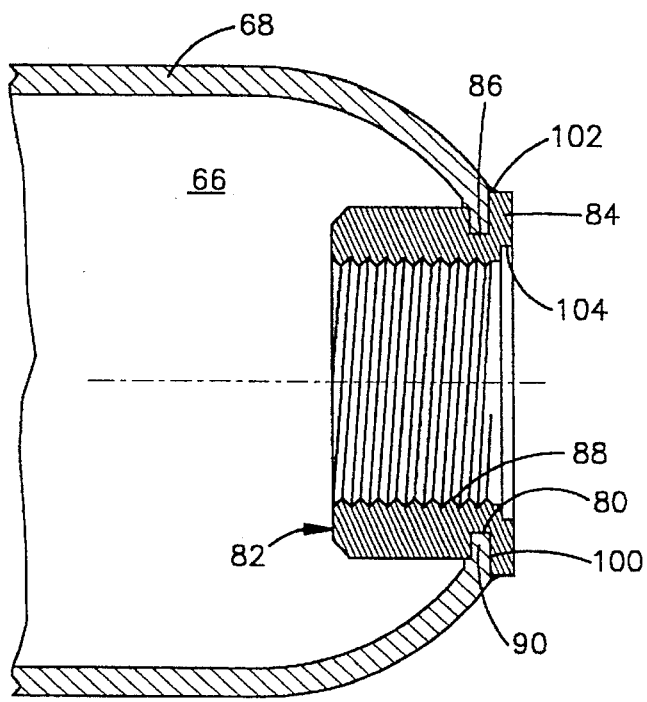
FIG. 3 is a sectional view of the end portion of the inflator of FIG. 2 with parts removed.

The retainer 82 is tubular and has a radially outward projecting flange 84 (FIG. 3) located at one end. The retainer 82 includes an annular groove 86 in an external circumferential surface located adjacent the flange 84. A thread 88 is formed in an inner circumferential surface of the retainer 82. A recess 104 is also formed in the inner circumferential Surface of the retainer 82 adjacent the flange 84.

An end portion 90 of the cylinder 68 is deformed into the groove 86 in the retainer 82 to locate and hold the retainer in the opening 80. The flange 84 of the retainer 82 engages an end surface 100 of the cylinder 68 and is located outside of the cylinder. To ensure a fluid-tight seal around the opening 80 in the container 64 and to attach the retainer 82 to the cylinder 68, the flange 84 of the retainer is welded at a continuous circumferential weld 102 to the cylinder. The majority of the retainer 82 extends into the chamber 66 in the container 64.

The container 64 also includes a plug assembly 120 (FIG. 2) located in the retainer 82 to close the chamber 66 in the container. The plug assembly 120 (FIGS. 4 and 5) includes an electrically conductive metal plug 121. The plug 121 is tubular and defines an internal diffuser chamber 122 located centrally along a longitudinal central axis A of the cylinder 68. The plug 121 initially blocks the flow of fluid from the chamber 66 through the retainer 82 and through the opening 80 in the cylinder 68.

An exterior portion of the plug 121 has a thread 124 which engages the thread 88 of the retainer 82. The plug 121 also has a tool receiving portion 126 which is spaced axially from the thread 124 and has a greater radial extent than the thread. A seal 128 (FIG. 2) is compressed in the recess 104 in the flange 84 of the retainer 82 when the plug 121 is screwed into the retainer until a radially extending surface 140 (FIGS. 4 and 5) of the plug 121 engages the flange Of the retainer.

Figure 4:
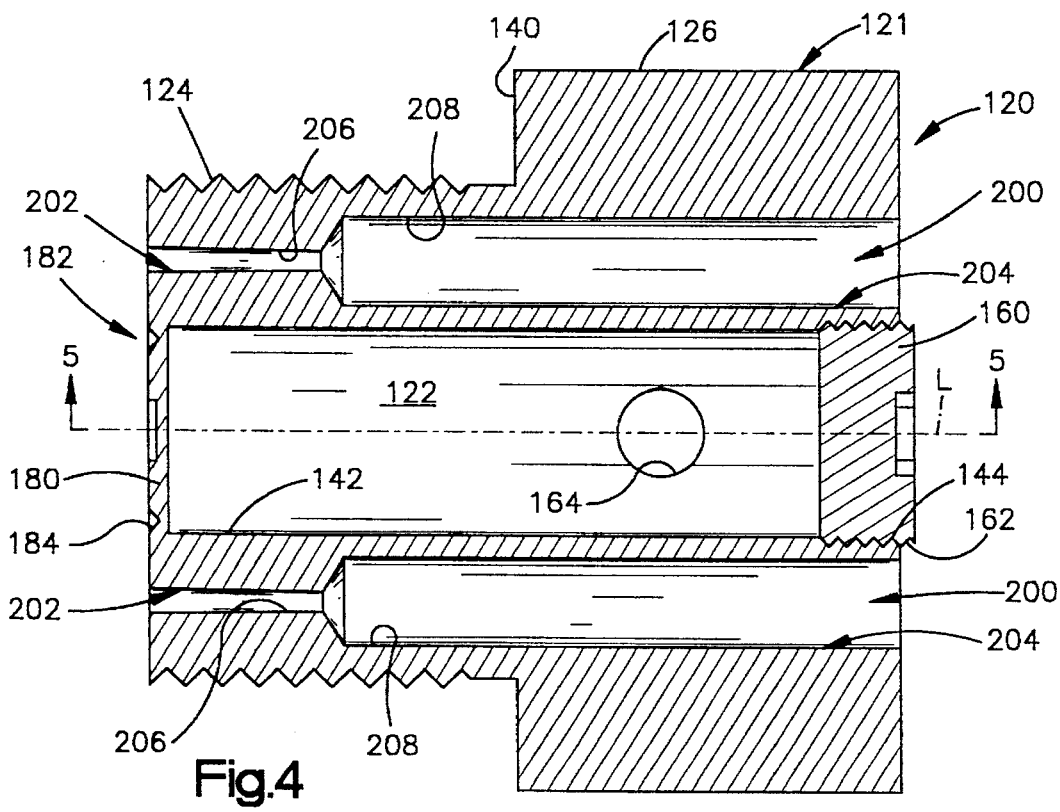
FIG. 4 is an enlarged sectional view of a part of the inflator of FIG. 2.

A right end portion of an interior surface 142 of the plug 121 defining the diffuser chamber 122, as viewed in FIG. 4, has a thread 144. An end cap 160 has an exterior surface with a thread 162. The thread 162 on the end cap 160 engages the thread 144 in the end portion of the plug 121 to close the right end of the plug, as viewed in FIGS. 2, 4 and 5. The end cap 160, when received in the plug 121, blocks fluid flow out of the right end of the plug.

The plug 121 has a plurality of discharge passages 164 which fluidly communicate the diffuser chamber 122 with the exterior of the container 64. The discharge passages 164 extend radially from the diffuser chamber 122 through the tool receiving portion 126 of the plug 121. The discharge passages 164 direct the flow of inflation fluid from the diffuser chamber 122 in the plug assembly 120 into the reaction canister 28 to inflate the air bag 24.

Figure 5:
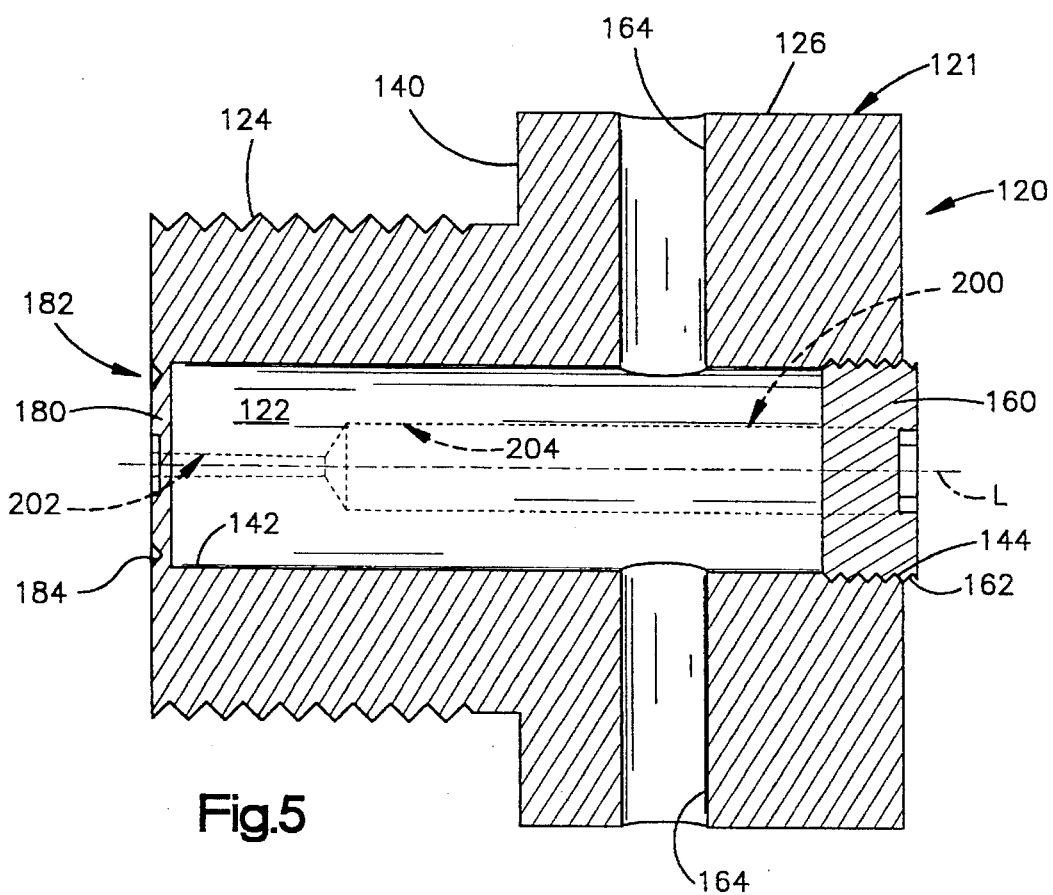
FIG. 5 is a sectional view of the part of FIG. 4, taken approximately along the line 5—5 in FIG. 4.

The plug 121 includes a closure 180 located at a left end of the diffuser chamber 122, as viewed in FIGS. 4 and 5, opposite the end cap 160. The closure 180 is formed in one piece with the plug 121 to block the flow of inflation fluid into the diffuser chamber 122. The closure 180 includes a weakened portion 182 with a diameter slightly less than the diameter of the inner surface 142 of the diffuser chamber 122. The axis A of the cylinder 68 passes through the center of the closure 180, as viewed in FIG. 2.

The weakened portion 182 (FIGS. 4 and 5) of the closure 180 is a V-shaped annular groove or stress riser 184 which has a thickness measured in a direction parallel to the axis A less than a thickness of the closure 180 adjacent the stress riser. The weakened portion 182 ruptures in response to fluid pressure in the chamber 66 increasing to a predetermined pressure which is greater than the initial pressure of the stored inflation fluid. When the weakened portion 182 ruptures, a now separated disk of the closure 180 moves into the diffuser chamber 122 to a location in which it does not block inflation fluid from flowing through the discharge passages 164, such as against the end cap 160.

Two passages 200 (FIG. 4) extend axially through the plug 121. The passages 200 extend in a direction parallel to a longitudinal central axis L of the plug 121. The passages 200 are spaced radially from the axis L and from the diffuser chamber 122. The passages 200 are identical and only one of the passages will be described in detail.

As best seen in FIG. 4, the passage 200 includes a tapered portion 202 and a cylindrical portion 204 which extend coaxially and are in fluid communication. The tapered portion 202 of the passage 200 is defined by a surface 206 of the plug 121. The cylindrical portion 204 of the passage 200 is defined by surface 208 of the plug 121. The cylindrical portion 204 has a diameter measured normal to the axis L which is greater than the largest diameter of the tapered portion 202. The tapered portion 202 of the passage 200 is located so the largest diameter of the tapered portion is at the end of the plug 121 adjacent the chamber 66, as viewed in FIG. 2. The smallest diameter of the tapered portion 202 is located adjacent the cylindrical portion 204 of the passage 200.

Two electrical conduits 220 (FIG. 2) are located in the tapered portions 202 of the passages 200. The electrical conduits 220 are identical and only one of the electrical conduits will be described in detail.

Figure 6:
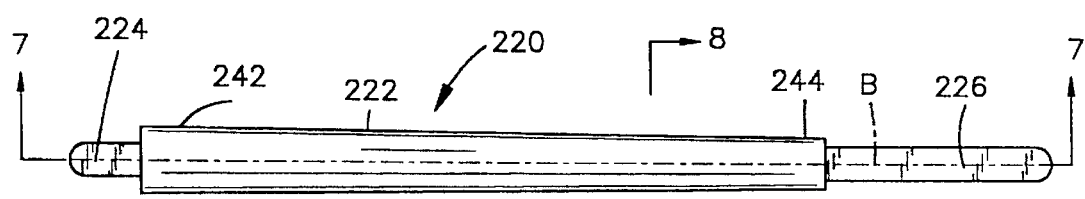
FIG. 6 is an enlarged side view of an electrical conduit of the inflator of FIG. 2.
Figure 7:
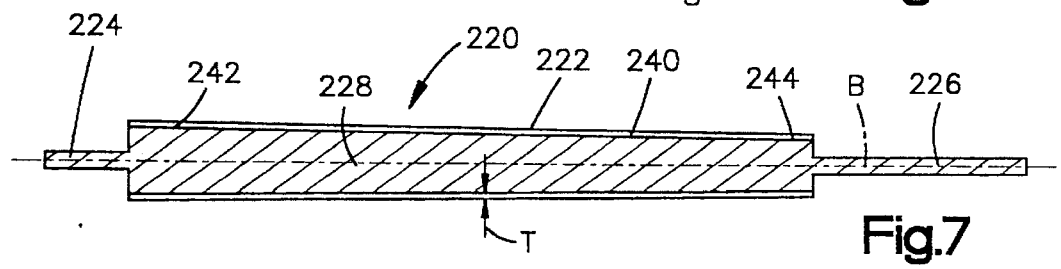
FIG. 7 is a sectional view of the electrical conduit of FIG. 6, taken approximately along the line 7—7 of FIG. 6.
Figure 8:
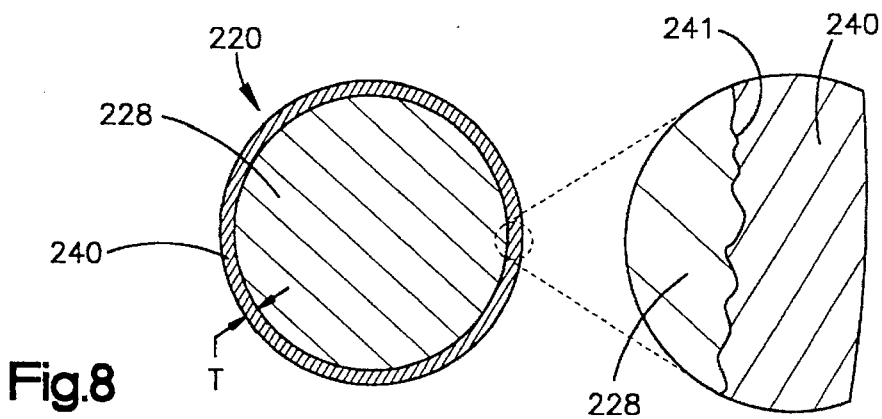
FIG. 8 is an enlarged sectional view of the electrical conduit of FIG. 6, taken approximately along the line 8—8 in FIG. 6.

Each electrical conduit 220 is made from an aluminum alloy base metal 228 (FIGS. 7 and 8). The electrical conduit 220 includes a tapered body 222 (FIGS. 6 and 7) which is located between a pair of connector ends 224, 226. The tapered body 222 includes an electrically insulating anodic coating 240 (FIG. 8). The insulating anodic coating 240 is an oxide layer formed by anodic oxidation, commonly referred to as "anodization".

To manufacture each electrical conduit 220, the insulating anodic coating 240 is formed on a solid tapered pin made from the aluminum alloy base metal 228. The anodic coating 240 is oxidized aluminum with a thickness "T" measured radially from a longitudinal central axis of the pin which is in the range of about 0.002 to 0.003 inch. An interface 241 between the base metal 228 and the insulating anodic coating 240 may not be smooth and can be distorted or uneven, as shown in the enlarged portion of FIG. 8. The anodic coating 240 is obtained by anodizing the solid tapered pin such as by treating the solid tapered pin with a material such as sulfuric acid, oxalic acid, or chromic acid. The solid tapered pin acts as an anode during the anodization process.

Figure 2:
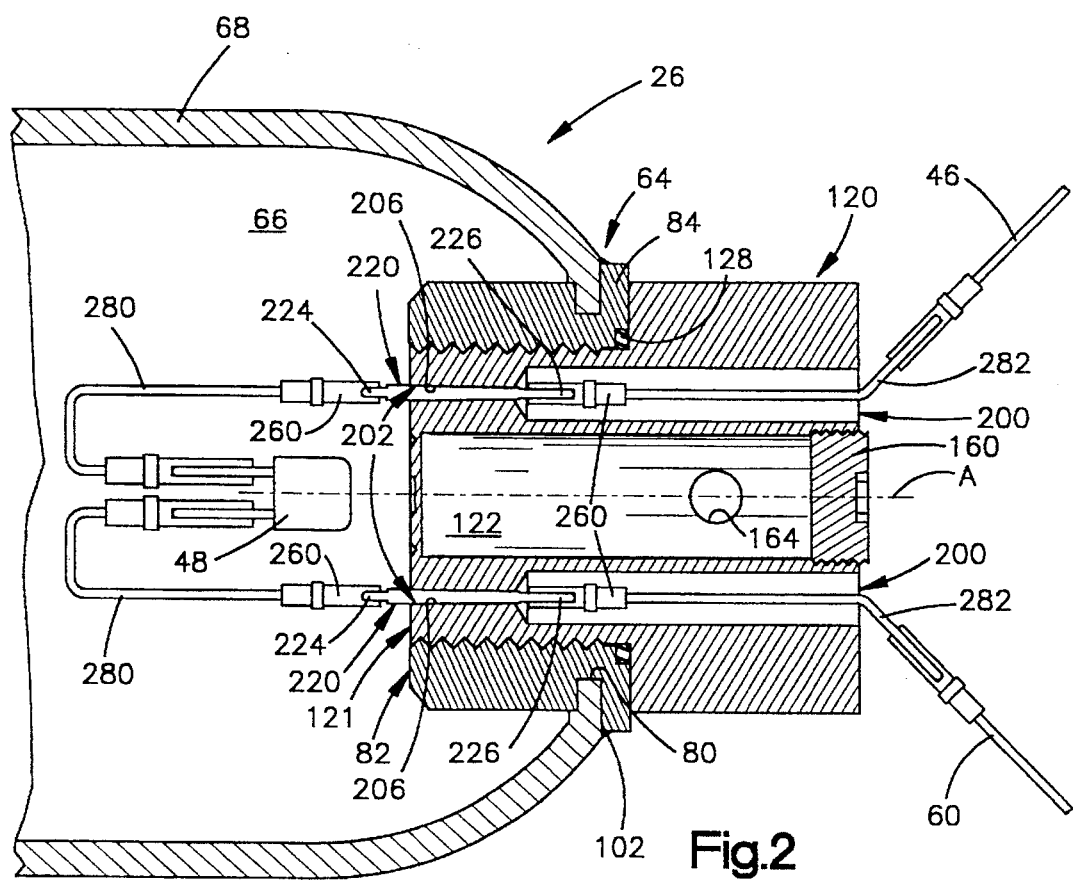
FIG. 2 is an enlarged sectional view of an end portion of the inflator of FIG. 1.

The connector ends 224, 226 are formed by grinding opposite ends of the anodized solid tapered pin to remove the insulating anodic coating and expose the aluminum base metal 228. The connector ends 224, 226 are ground to a size and shape to receive electrical connectors 260 (FIG. 2). The connector ends 224, 226 of the electrical conduit 220 are in electrically conductive communication with the connectors 260 to transmit electrical energy through the electrical conduit.

The anodic coating 240 on the electrical conduit 220 provides electrical insulation between the electrically conductive plug 121 of the container 64 and the conductive aluminum base metal 228 of the electrical conduit 220. The surface 206 of the tapered portion 202 of the passage 200 may also be anodized. Thus, the tapered portion 202 of the passage 200 may also have electrically insulating features.

The first connector end 224 of the electrical conduit 220 is located to the left, as viewed in FIG. 2, in the chamber 66 when the electrical conduit is located in the tapered portion 202 of the passage 200 in the plug assembly 120. The second connector end 226 of the electrical conduit 220 is located to the right, as viewed in FIG. 2, away from the chamber 66 and in the cylindrical portion 204 of the passage 200.

The tapered body 222 (FIGS. 6 and 7) of the electrical conduit 220 has a first end portion 242 which is located adjacent the connector end 224. The first end portion 242 of the tapered body 222 has a first diameter measured in a plane extending normal to a longitudinal central axis B of the electrical conduit 220. The tapered body 222 of the electrical conduit 220 has a second end portion 244 which is located adjacent the connector end 226. The second end portion 244 has a second diameter measured in plane normal to the axis B which is less than the first diameter.

The outer surface of the tapered body 222 of the electrical conduit 220 engages the inner surface 206 of the tapered portion 202 of the passage 200. The tapered body 222 of the electrical conduit 220 fits tightly within the tapered portion 202 of the passage 200 to form a fluid-tight seal. Pressure in the chamber 66 acts on the first end portion 242 of the electrical conduit 220 to force the tapered body 222 of the electrical conduit 220 further into fluid-tight sealing engagement against the tapered portion 202 of the passage 200.

Each first connector end 224 of the electrical conduits 220 is connected with an electrically conductive and rigidly formed wire 280 through the connectors 260. Each of the wires 280 is connected with the actuating device 48. The actuating device 48 is preferably a known lightweight igniter which contains an ignitable material, such as $BKNO_3$. The ignitable material ignites in response to heat in a bridgewire caused by electrical energy passing through the bridgewire. The bridgewire heats a bridgewire mix which ignites to ignite the ignitable material.

Combustion of the ignitable material in the actuating device 48 produces combustion products, including heat and hot particles, which contact and ignite the fuel gas in the mixture of gases stored in the chamber 66. The wires 280 are rigid enough and have sufficient strength to support the actuating device 48 in the chamber 66 so that the actuating device does not engage the cylinder 68 and to assure that the wires do not break during operation of the vehicle. Each second connector end 226 of the electrical conduits 220 is electrically connected to a rigid support 282 which is spaced from the cylindrical portion 204 of the passage 200. The supports 282 are also connected to the wires 46, 60 of the actuating circuit 40.

To assemble the inflator 26, the retainer 82 is fixed to the cylinder 68. The end portion 90 (FIG. 3) of the cylinder 68 defining the opening 80 is deformed into the groove 86 in the retainer 82. The retainer 82 is sealed to the cylinder 68 by the weld 102.

The end cap 160 is screwed into the threaded portion 144 of the plug 121. The electrical conduits 220 are inserted into the tapered portions 202 of the passages 200 in the plug assembly 120, as illustrated in FIG. 2. Connectors 260 having the rigidly formed wires 280 carrying the actuating device 48 are attached to the first connector ends 224 of the electrical conduits 220. The connectors 260 on the rigid supports 282 are attached to the second connector ends 226 of the electrical conduit 220.

The plug assembly 120 is screwed into the retainer 82. The chamber 66 in the container 64 is charged with a fuel gas, an oxidizer gas and an inert gas. The inflator 26 is then assembled into the module 22 which is attached as a unit into a vehicle. The wires 46, 60 of the actuating circuit 40 are connected to the rigid supports 282.

In operation, upon the occurrence of a vehicle situation, such as a collision, which requires inflation of the air bag 24, the switch 44 in the actuating circuit closes. Electrical energy flows through the wires 46, 60 of the actuating circuit 40 to the actuating device 48 through the electrical conduits 220. The ignitable material in the actuating device 48 ignites and produces combustion products. The fuel gas in the mixture of gases in the chamber 66 ignites. The combustion of the fuel gas is supported by the oxidizer gas within the mixture of gases to heat the inert gas which provides heated and pressurized inflation fluid in the chamber 66.

The pressure of the inflation fluid in the chamber 66 rises due to heating as the fuel gas continues to burn. When the predetermined pressure of the inflation fluid in the chamber 66 is reached, the weakened portion 182 of the closure 180 ruptures. The broken away disk portion of the closure 180 moves in the diffuser chamber 122 past the discharge passages 164. The heated inflation fluid enters the diffuser chamber 122 and flows through the discharge passages 164 in the plug 121. The heated inflation fluid then flows into the air bag 24 to inflate the air bag to help protect a vehicle occupant.

From the above description of the invention, those skilled in the art will perceive improvements, changes and modifications. Such improvements, changes and modifications within the skill of the art are intended to be covered by the appended claims.

Having described the invention, the following is claimed:

1. An inflator which provides inflation fluid for inflating an inflatable vehicle occupant protection device, said inflator comprising:

a container having a wall which defines a chamber for holding fluid under pressure;

an electrically actuatable device in the chamber which starts the flow of fluid from said container upon actuation of said device;

first surface means for defining a passage extending through the wall of said container;

an elongated electrical conductor extending through said passage for conducting electrical energy to said electrically actuatable device;

said electrical conductor having second surface means for contacting said first surface means to provide a fluid seal between said first and second surface means; and an anodic coating on at least one of said first and second surface means providing electrical insulation between said container and said electrical conductor;

said passage being tapered with a larger end of the passage located closer to the chamber than a smaller end of the passage.

2. An inflator as defined in claim 1 wherein said electrical conductor comprises a tapered body with opposite end portions, said second surface means comprising a surface of said tapered body, each of said end portions of said tapered body being adapted to be connected to another electrical conductor, a first one of said end portions being located adjacent a larger portion of said tapered body, said first end portion adapted to be exposed to fluid within the chamber to urge said second surface means against said first surface means.

3. An inflator as set defined in claim 2 further including:

a first wire connectable with said first end portion of said electrical conductor for conducting electrical energy to said electrically actuatable device; and a second wire connectable with a second end portion of said electrical conductor at a location outside the chamber for conducting electrical energy to said electrical conductor.

4. An inflator which provides inflation fluid for inflating an inflatable vehicle occupant protection device, said inflator comprising:

an electrically conductive container defining a chamber for holding fluid at a first pressure;

an electrically actuatable device located in the chamber for effecting a change in the pressure of the fluid in the chamber to a second pressure greater than the first pressure;

first surface means for defining a passage extending through said container;

an electrical conductor extending through said passage for conducting electrical energy to said electrically actuatable device;

said electrical conductor having second surface means contacting said first surface means to provide a fluid seal between said first and second surface means and a connector located at each of axially opposite ends of said second surface means, one connector being located in the chamber and being electrically connectable with said electrically actuatable device, the other connector being located outside the chamber and electrically connectable with a source of electrical power; and an anodic coating on at least one of said first and second surface means providing electrical insulation between said container and said electrical conductor;

said passage being tapered with a larger end of the passage located closer to the chamber than a smaller end of the passage.

5. An inflator as defined in claim 4 wherein said electrical conductor includes a tapered body with opposite end portions, said second surface means comprising a surface of said tapered body, each end portion of said tapered body being adapted to be connected to another electrical conductor, a first one of said end portions being located adjacent a larger portion of said second surface means, said first end portion adapted to be exposed to fluid within the chamber to urge said second surface means against said first surface means.

6. An inflator as set defined in claim 5 further including:

a first wire connectable with said first end portion of said electrical conductor for conducting electrical energy to said electrically actuatable device; and a second wire connectable with a second end portion of said electrical conductor at a location outside the chamber for conducting electrical energy to said electrical conductor.

7. An improved electrical conductor for an inflator that provides inflation fluid for inflating an inflatable vehicle occupant protection device, the inflator including an electrically conductive container defining a chamber for holding inflation fluid for inflating the protection device, the container also including an electrically actuatable device located in the chamber and a first surface defining a passage extending through the container, wherein the improvement comprises:

a body extendable through the passage for delivering electrical energy to the electrically actuatable device in the chamber, said body having a second surface contacting the first surface of the container to provide a fluid seal between said first and second surfaces; and an electrically insulating anodic coating on at least one of said first and second surfaces providing electrical insulation between the container and said body;

said passage being tapered with a larger end of the passage located closer to the chamber than a smaller end of the passage.

8. The apparatus of claim 7 wherein said second surface of said body is tapered and said body has opposite end portions, each of said end portions of said body being adapted to be connected to an electrical conductor, a first one of said end portions being located adjacent a larger portion of said second surface, said first end portion being exposed to fluid within the chamber to urge said second surface against said first surface.

9. The apparatus as set forth in claim 8 further including:

a first wire connectable with said first end portion of said body for conducting electrical energy to said electrically actuatable device; and a second wire connectable with a second end portion of said body at a location outside of the chamber for conducting electrical energy to said body.

10. An inflator comprising:

a container having a chamber for holding inflation fluid under pressure;

an electrically conductive plug closing an opening in said container, said plug having a rupturable closure part and first surface means for defining a passage extending into said chamber through said plug;

an electrically actuatable device in said chamber for causing said closure part to rupture upon actuation of said device;

an electrical conductor extending through said passage in said plug for conducting electrical energy to said electrically actuatable device, said electrical conductor having second surface means for contacting said first surface means to provide a fluid seal between said plug and electrical conductor; and an anodic coating on at least one of said first and second surface means providing electrical insulation between said plug and said electrical conductor.

11. An inflator as defined in claim 10 wherein said passage in said plug is tapered with a larger end of said passage located closer to said chamber than a smaller end of said passage.

12. An inflator as defined in claim 11 wherein said electrical conductor comprises a tapered body with opposite end portions, said second surface means comprising a surface of said tapered body, each of said end portions of said tapered body being connectable with an electrical connector, a first one of said end portions being located adjacent a larger portion of said tapered body, said first end portion being exposed to fluid within said chamber to urge said second surface means against said first surface means.

13. An inflator as defined in claim 12 further including:

a first wire connectable with said first end portion of said electrical conductor at a location inside said chamber for conducting electrical energy to said electrically actuatable device; and a second wire connectable with a second end portion of said electrical conductor at a location outside said chamber for conducting electrical energy to said electrical conductor.

14. The apparatus of claim 10 wherein said electrical conductor has a major body portion formed of an aluminum base metal.

15. The apparatus of claim 14 wherein said anodic coating comprises an oxide layer formed on said aluminum base metal.

* * * * *